United States Patent
Li et al.

(10) Patent No.: US 7,680,645 B2
(45) Date of Patent: Mar. 16, 2010

(54) SOFTWARE FEATURE MODELING AND RECOGNITION

(75) Inventors: Yantao Li, Beijing (CN); Bing Sun, Beijing (CN); Shuguang Ye, Beijing (CN); Guowei Liu, Beijing (CN); Wenli Zhu, Beijing (CN); Haidong Zhang, Beijing (CN); Min Wang, Beijing (CN); Jian Wang, Beijing (CN)

(73) Assignee: Microsoft Corporation, Redmond, WA (US)

(*) Notice: Subject to any disclaimer, the term of this patent is extended or adjusted under 35 U.S.C. 154(b) by 341 days.

(21) Appl. No.: 11/818,596

(22) Filed: Jun. 15, 2007

(65) Prior Publication Data

US 2008/0312899 A1    Dec. 18, 2008

(51) Int. Cl.
*G06F 9/45* (2006.01)
(52) U.S. Cl. .......................... 703/22; 714/38
(58) Field of Classification Search ............ 703/22; 715/762, 763; 717/130, 131; 714/38
See application file for complete search history.

(56) References Cited

U.S. PATENT DOCUMENTS

| | | | |
|---|---|---|---|
| 5,500,941 A | 3/1996 | Gil | |
| 5,542,070 A | 7/1996 | LeBlanc et al. | |
| 5,867,144 A * | 2/1999 | Wyard | 715/769 |
| 5,903,886 A | 5/1999 | Heimlich et al. | |
| 6,046,741 A * | 4/2000 | Hochmuth | 715/704 |
| 6,233,570 B1 | 5/2001 | Horvitz et al. | |
| 6,374,369 B1 * | 4/2002 | O'Donnell | 714/38 |
| 6,862,696 B1 | 3/2005 | Voas et al. | |
| 6,912,692 B1 * | 6/2005 | Pappas | 715/762 |
| 6,963,826 B2 | 11/2005 | Hanaman et al. | |
| 7,039,166 B1 | 5/2006 | Peterson et al. | |
| 7,197,447 B2 * | 3/2007 | Susskind | 703/22 |
| 7,401,331 B2 * | 7/2008 | Leung | 717/168 |
| 2006/0075399 A1 | 4/2006 | Loh et al. | |
| 2007/0039009 A1 | 2/2007 | Collazo | |
| 2007/0233628 A1 * | 10/2007 | Sherwood et al. | 706/46 |

FOREIGN PATENT DOCUMENTS

WO    0175678 A1    10/2001

OTHER PUBLICATIONS

Titzer et al., Nonintrusive Precision Instrumentation of Microcontroller Software, Jul. 2005, ACM SIGPLAN Notices, vol. 40, Issue 7, pp. 59-68.*

(Continued)

*Primary Examiner*—Paul L Rodriguez
*Assistant Examiner*—Aniss Chad

(57) ABSTRACT

Described is a technology by which software program feature usage is located within a sequence of commands collected during program usage sessions. For example, feature generally corresponds to a series of commands, such as copy and paste. A visual modeling component is controlled via drag-and-drop operations to describe a feature model, which is then compiled by a compiler into a finite state machine. Noise models may be used to exclude any command in the sequence that is irrelevant to the feature usage. A recognition process uses the finite state machine to locate program feature usage within the sequence of recorded commands by matching command sub-sequences corresponding to the feature model via the state machine. An analyzer may then use the located matches to provide an analysis report on feature usage.

21 Claims, 8 Drawing Sheets

OTHER PUBLICATIONS

Linton et al., Building User and Expert Models by Long-Term Observation of Application Usage, 1999, Springer-Verlag New York, Inc., Proceedings of the seventh international conference on User modeling, pp. 129-138.*

Corbett, James C., et al., "Bandera: Extracting Finite state Models from Java Source Code", 2000, pp. 439-448.

Puerta, Angel, et al.,"XIML: A Common Representation for interaction Data", IUP02, Jan. 13-16, 2002, pp. 214-215.

* cited by examiner

| Session ID | Mem size | CPU | App | Exit type | User ID | ... |
|---|---|---|---|---|---|---|
| 0 | 223M | 1GHz | Word | Normal | 0 | ... |
| 1 | 511M | 2GHz | Word | Crash | 3 | ... |
| 2 | 512M | 733MHz | Word | Normal | 1 | ... |
| 3 | 768M | 1GHz | Excel | Normal | 0 | ... |
| 4 | 1024M | 1.5G Hz | Outlook | Crash | 2 | ... |
| 5 | 128M | 366MHz | Word | Normal | 2 | ... |
| 6 | 512M | 733MHz | Excel | Normal | 3 | ... |
| 7 | 192M | 366MHz | Excel | Normal | 5 | ... |
| 8 | 1024M | 2GHz | Outlook | Normal | 7 | ... |
| 9 | 512M | 1GHz | Word | Hang | 7 | ... |
| ... | ... | ... | ... | ... | ... | ... |

*FIG. 1*

SOFTWARE FEATURE MODELING AND RECOGNITION

CROSS-REFERENCE TO RELATED APPLICATIONS

Analyzing Software Users with Instrumentation Data and User Group-Modeling and Analysis, U.S. patent application Ser. No. 11/818,610; Reliability Analysis Using Alerts, Asserts, and UI Controls, U.S. patent application Ser. No. 11/818,612; Multidimensional Analysis Tool for High Dimensional Data, U.S. patent application Ser. No. 11/818,607; Efficient Data Infrastructure for High Dimensional Data Analysis, U.S. patent application Ser. No. 11/818,879; Software Feature Usage Analysis and Reporting, U.S. patent application Ser. No. 11/818,879; Analyzing Software Usage with Instrumentation Data, U.S. patent application Ser. No. 11/818,611.

BACKGROUND

Understanding the way in which software users use software can be very valuable when working to improve the effectiveness and ease of use of software applications. Traditional ways to analyze software users include usability studies, user interviews, user surveys and the like.

Various data can be collected during actual software usage to obtain information related to how users use and otherwise interact with a software program. However, analyzing that data to obtain useful information is a difficult problem.

Moreover, contemporary software is getting more and more sophisticated as advanced features are introduced. However, traditional usability studies only provide knowledge about feature usage that was obtained in artificial environments, which is not sufficient to understand software feature usage in real world applications.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which program feature usage is located within a set of information corresponding to data collected during program usage sessions. A modeling component such as a visual user interface controlled via drag-and-drop operations is used to describe a feature. Feature model data is output from the modeling component, and compiled by a compiler into a finite state machine. A recognition process uses the finite state machine to locate program feature usage within the information (a sequence of recorded commands) corresponding the collected program usage session data. One or more noise models may be used to exclude (eliminate or skip over) commands in the sequence that are irrelevant to the feature usage.

In one example implementation, the feature model may be built from elements including a feature element, a command element, a select element, a repeat element, an enum (enumerate) element or a procedure element. The visual structure of the elements defines their relationships and how they are executed in the feature model. The compiler may check the validity of the feature model, and/or normalize the finite state machine. In this example, the recognition process locates the feature usage by matching a sequence of commands corresponding to the feature model via the state machine. An analyzer may then use the located matches to provide an analysis report on feature usage.

The recognition process processes a sequence of commands recorded in program usage sessions to recognize a specified feature usage in the sequence, including by using a finite state machine to determine when a command in the sequence changes the state machine to a terminal state. When the state machine changes to a terminal state, the recognition process recording a set of one or more candidate as match results. The recognition process and finite state machine may continue processing commands after the state machine changes to the terminal state, to attempt to find a longer match. The state machine is re-run as needed throughout the command sequence.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which:

FIG. 1 shows a representation in a table format of example software instrumentation (e.g., software quality metrics) data saved for various program usage sessions by users of a suite of application programs.

DETAILED DESCRIPTION

Figure 2:
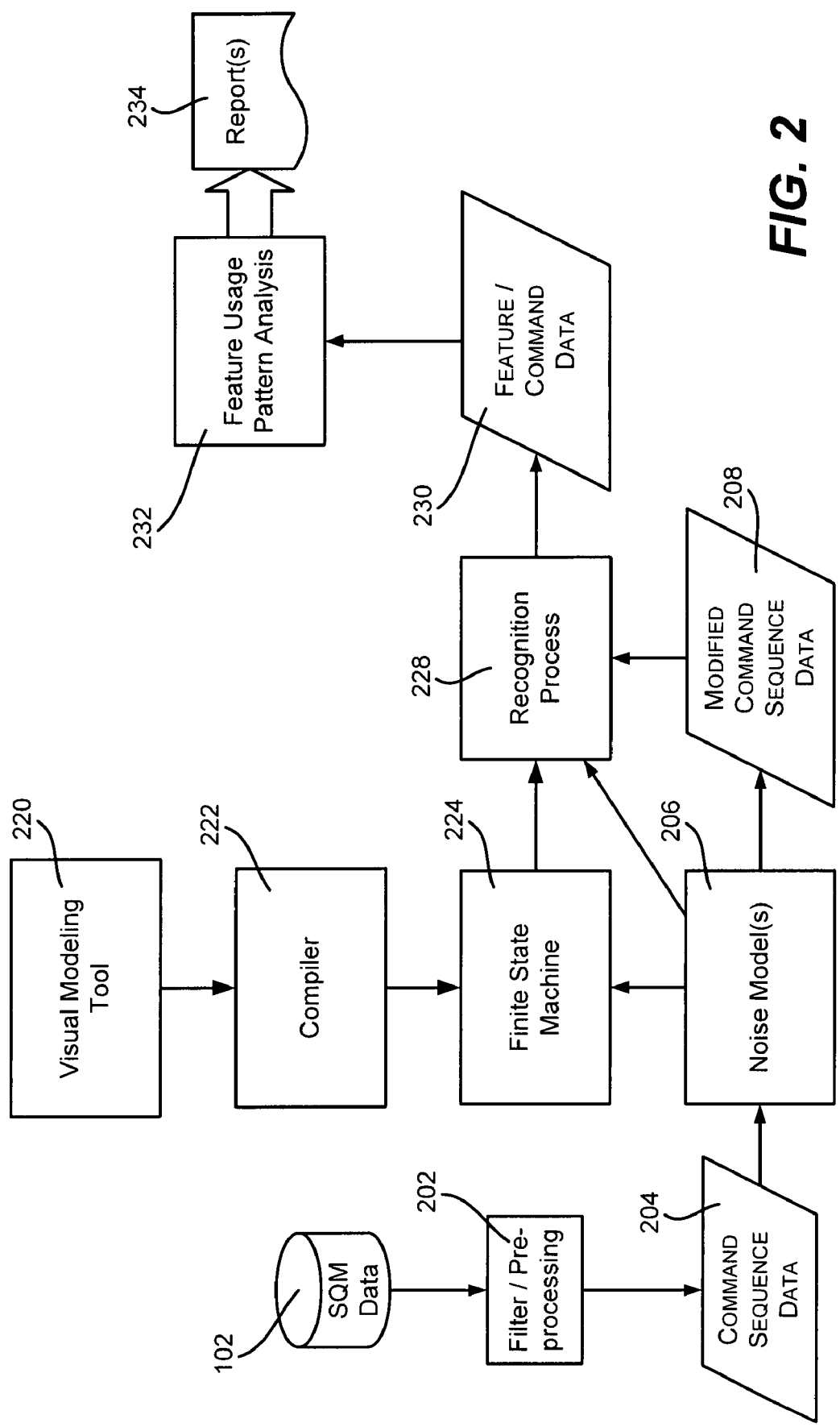
FIG. 2 shows an example block diagram representation of various components used in software feature modeling and recognition.

Various aspects of the technology described herein are generally directed towards analyzing software data collected from real software users to model and recognize software users' usage of software features. For example, commands (e.g., initiated via clicks or keyboard use) and command sequences provide important information on how users use a software product to help understand user-software interaction, where "command sequence" refers to a sequence of clicks on (or equivalent keyboard interaction with) menus, toolbars and other actionable icons when users use a software product.

For purposes of understanding the description, the technology is described herein by use of such examples, including feature usage in a suite of application programs such as those provided as part of the Microsoft® Office software product suite. However, as will be understood, these are only non-limiting examples, and the technology is applicable to different environments and different software products, including individual application programs and operating system components. In one aspect, the usage of a software feature is analyzed over the command sequence data. In this way, software engineers (such as program managers and usability engineers) can understand how a feature is used in the real world and can improve the feature based on the information.

Notwithstanding, such a modeling and recognition approach is extensible for analysis with other sequence data, such as web log click-through data. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

Turning to FIG. 1, software instrumentation data 102 comprise data collected from each user session, where a session corresponds to actual usage by a user of an executing program. A session starts from the application start (e.g., by double clicking on the application executable or a document that launches the application executable, or by choosing the application from a start menu), and ends when the application is closed (e.g., by choosing "Exit" in the application or closing the application window). Sessions can also be time limited, e.g., if a session exceeds twenty-four hours, the session is ended and the instrumentation data recorded (the application continues to run As seen in FIG. 1, the data (arranged in columns) collected for some number of sessions (arranged in rows). In one example implementation, each session is associated with some or all of the information shown in FIG. 1, including a session ID, a user ID, and an application name. Other information that is typically recorded includes the application version, a start time, an end time, the commands used during the session and still other data, such as the number of files opened and so forth. Note that in actual implementations, the instrumentation data 102 may be many thousands of dimensions (columns). The software instrumentation data related to programs sessions is sometimes referred to as software quality metrics (SQM) data; SQM records the commands used in each session, whereby a session typically corresponds to a sequence of commands.

Given a set of SQM data, feature usage may be analyzed. FIG. 2 shows various example components for processing and analyzing SQM data (or similar data) with respect to feature usage. Note that the SQM data 102 may first be filtered and otherwise pre-processed (block 202), e.g., so that only the commands used in features are efficiently accessed, as represented by the command sequence data block labeled 204. Further, some commands in a sequence of commands are not part of feature usage, and are referred to as noise; one or more noise models 206 described below may be applied to modify the command sequence data (block 208) such as to eliminate such commands As also described below, a visual modeling tool 220 allows an operator of the analysis to define aspects of feature analysis. A compiler 222 compiles the output of the modeling tool 220 into a finite state machine 224. A recognition process 226 uses the finite state machine to locate feature usage. Data 230 corresponding to the recognized feature usage and commands may then be analyzed (block 232) and output as information in some way, such as in one or more reports 234.

User behavior may be very complex, and generally a feature needs to handle such complicated interactions. As used herein, the element of a feature is referred to as a command, and user interaction typically corresponds to a sequence of commands. The definition of each command and the dictionary of all available commands are application specific. For example, in the Microsoft® Office suite of application programs, to use the copy-paste feature, users may need to use four commands, namely "edit menu ->copy ->edit menu ->paste." A suitable mathematical foundation of a feature modeling language is finite state machine theory, such as described in the reference "*Introduction to Automata Theory, Languages, and Computation*" by John E. Hopcroft, Rajeev Motwani, Jeffrey D. Ullman.

To this end, a feature corresponds to one finite state machine, where the state is the feature's status after one command and the alphabet refers to all (or some other defined subset) of the commands in the application. The transition function maps the input command and current state to a next state.

The finite state machine can be formally defined as $M=(\Sigma, S, \delta, s_0, F)$, where $\Sigma$ is the set of all commands used by user; the command may contain multiple properties;

S is the set of all states in the finite state machine;

$\delta$ is the state transition function, which is a single value mapping $S \times \Sigma \rightarrow S$;

$s_0$ is the initial state;

F is the terminal state set.

Figure 3:
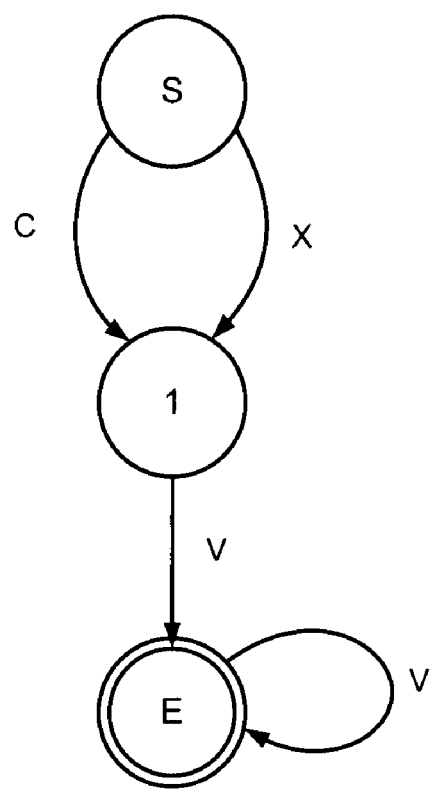
FIG. 3 is an example representation of a state machine representing cut, paste and copy feature usage.

For example, FIG. 3 gives a finite state machine representation of a feature that defines that the user copied or cut some entity, and then pasted the entity or several times. In FIG. 3, C denotes Copy, X denotes Cut and V denotes Paste.

In general, a finite state machine model is difficult for many users to learn and use. As a result, a feature modeling language has been developed to describe the finite state machine of a feature. In one implementation, this language has only six elements, which is sufficient for modeling current software features of a product such as Microsoft® Office, yet remains extensible for larger capability.

In this example implementation, the six feature modeling language elements comprise Feature, Command, Select, Repeat, Enum (Enumerate) and Procedure. These elements model commands or command sequences, and may be nested together to define a complex feature following a set of rules.

The Feature element is the subject of interest, and is the root element of the model. Each feature model contains only one feature element. The child elements of Feature may be Command, Select, Repeat or Procedure. The child elements of Feature are executed in a sequential manner, where 'executing one element of the feature' corresponds to one step of the user-software interactions.

The Command element corresponds to a command click of the application or a call to an Enum or Procedure. Command cannot contain any child element. A Command may have multiple properties, such as the command name or ID, location where the command is triggered, the state of the software when the command is triggered, and so on.

The Select element models interactions that can be done in alternative ways. The child elements of Select may be Command, Select, Repeat or Procedure. Only one of the child elements of Select is executed.

The Repeat element models interactions that may be executed repeatedly. The child elements of Repeat may be Command, Select, Repeat or Procedure. The child elements of Repeat are executed sequentially for one or more times.

The Enum element models a set of commands. Each Enum has a unique name, and it can be called by a Feature, Procedure or another Enum. In execution, only one of the child elements is executed.

Procedure is a sub-feature that can be called by the features. Each Procedure has a unique name, and it can be called by a feature or another procedure. The child elements of Procedure may be Command, Select, Repeat or Procedure. The child elements of Procedure are executed sequentially.

Figure 4:
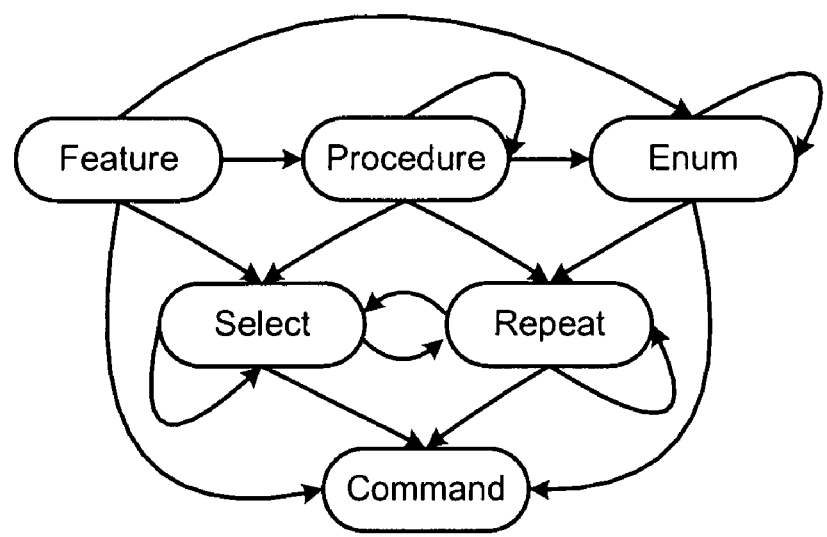
FIG. 4 is an example representation of elements of a feature including relationships between such elements.

Command, Repeat, and Select may be specified as 'Optional.' The six elements can be nested to define a feature. FIG. 4 shows the nested relationship of the feature model elements, where the arrows represent the possible nested relationships between elements. An element where an arrow start is considered as a container, and can contain element types with arrow ends.

The following is an example script corresponding to the feature in the above example.

```
Feature
{
    Select
    {
        Command("Copy");
        Command("Cut");
    }
    Repeat
    {
        Command("Paste");
    }
}
```

In one example implementation, a visual modeling tool is provided based on the feature modeling language. With this tool users can interact (e.g., by dragging and dropping blocks) to define the features. Thereafter, the tool automatically converts the visual model to the feature modeling language.

Figure 5:
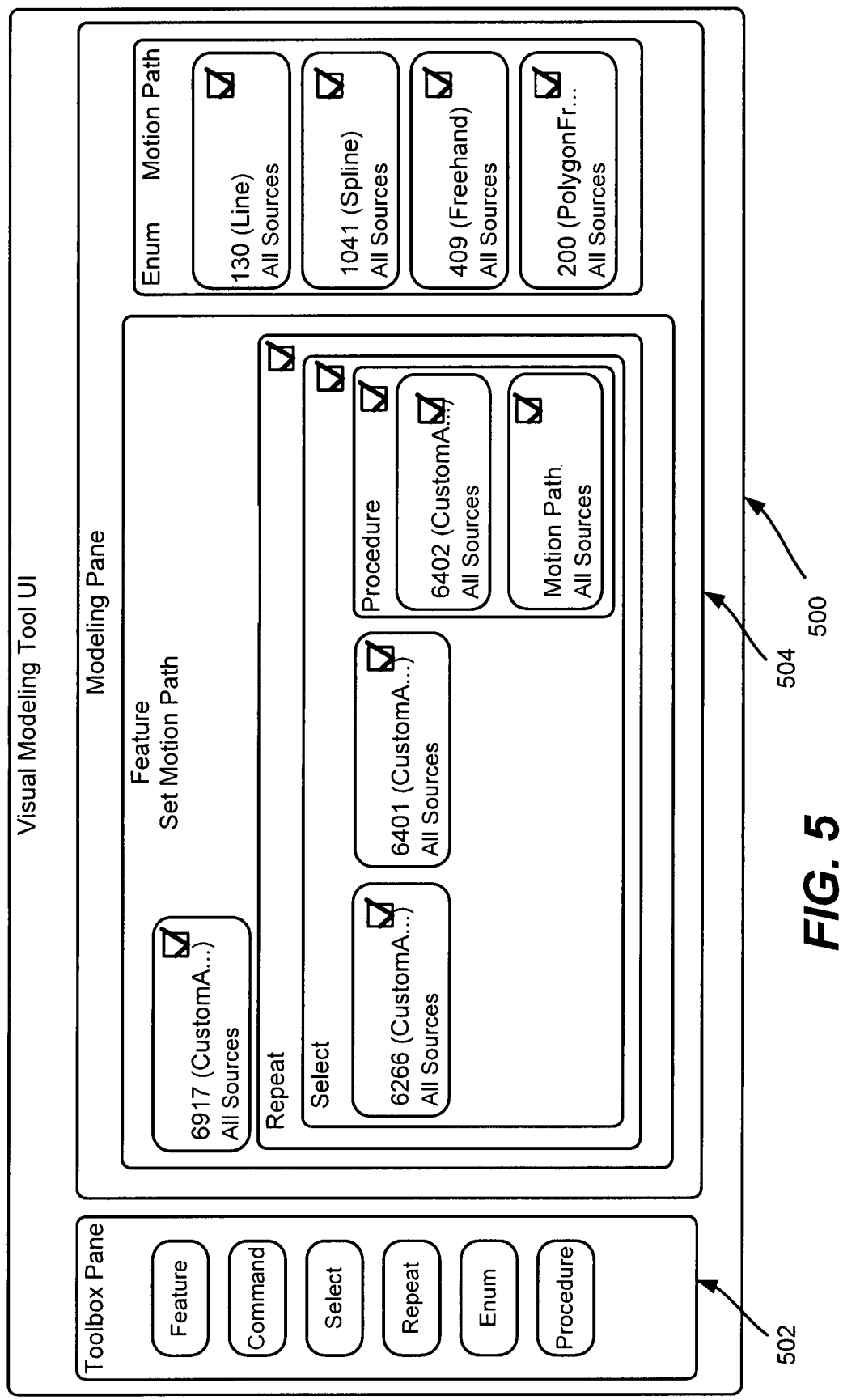
FIG. 5 is an example representation of a visual modeling tool user interface by which a feature can be defined for analysis.

As generally represented in FIG. 5, in this example the visual modeling tool uses block diagram concepts to facilitate definition of a feature. Block diagrams provide an intuitive way to represent nested relationships, and are easy to define and read.

The visual modeling tool includes a user interface 500 that provides an intuitive way to define features by drag-and-drop operations. For example, there may be two panes in the feature modeling user interface, a toolbox pane 502 and modeling pane 504. The toolbox pane contains the six basic elements for feature modeling. Users can drag the elements from toolbox pane to feature model pane to construct the feature. During the drag-and-drop operations, the validity of the nesting relationships is checked. If the container cannot contain the dragging elements, the drop operation to that container is disabled.

In general, each block in the pane 504 represents an element in the modeling language, and the topology of the blocks indicates the execution order and the relationships between the elements. For example, vertically placing the blocks means the corresponding elements are executed sequentially, while horizontally placing blocks means that only one of the elements is executed. The topology of child blocks within a certain element is automatically determined by the visual modeling tool.

After drag and drop a command control, users need to specify the exact command. For example, a dropdown menu or the like helps the user to define the command by entering the command ID, command name, or the name of an Enum or procedure. If a user types a letter, a dropdown window shows the matching command or commands. The user can hit the Enter key to enter the command or scroll in the dropdown via cursors or a mouse to select the desired command. Also, users can select "all commands" to specify any command of the application.

Procedure defines common sub-feature that can be called by the feature model. Procedure provides the option to reuse the parts of the model, and can also help to reorganize the complex feature definitions.

Enum is often used to represent a set of similar commands which are usually studied together. Similar to Procedure, Enum can also be reused with the modeling.

Figure 6:
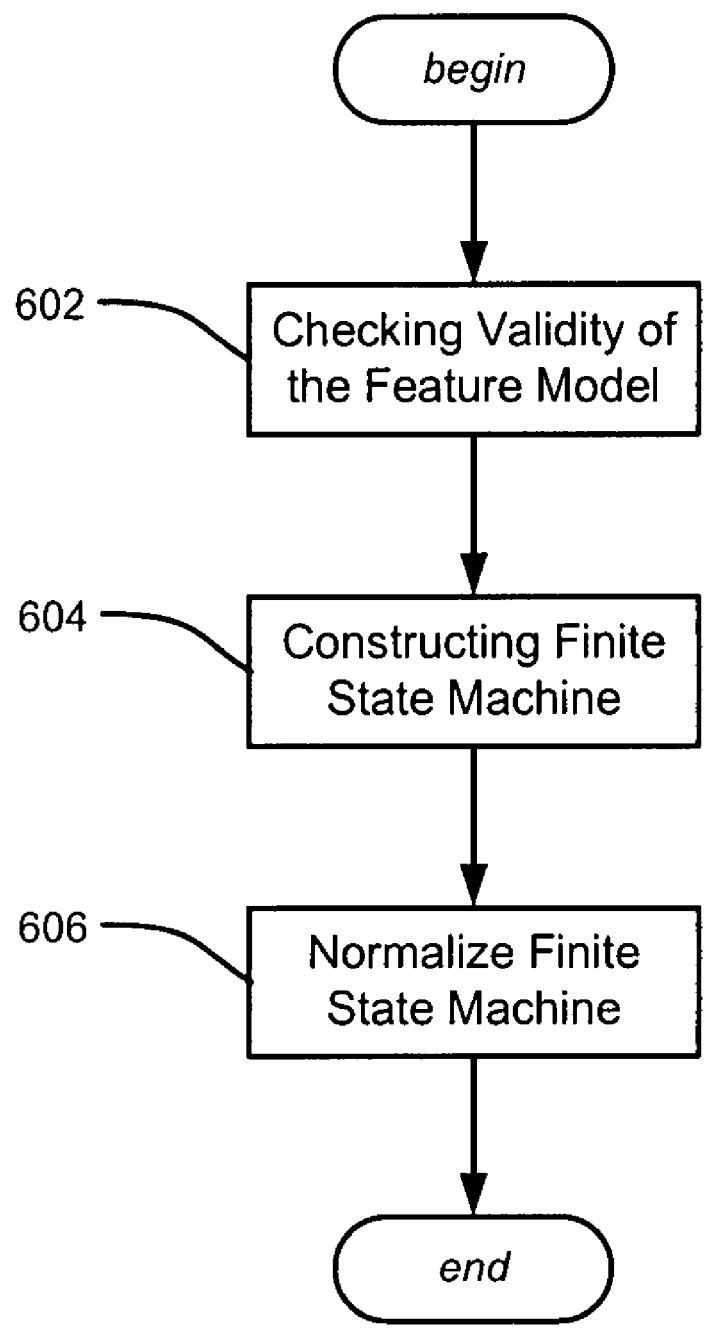
FIG. 6 is a flow diagram representing various example steps taken to compile output from a visual modeling tool into a finite state machine.

Turning to aspects of compilation, that is, compiler operation, the user-defined feature model (which is described by the feature modeling language) needs to be compiled to get a valid finite state machine for further use. FIG. 6 describes example steps in compiling a feature. Step 602 represents checking the validity of the feature model. More particularly, the compiler checks a set of rules, e.g., sequentially. If a rule is violated, the compiler will locate the error and highlight the corresponding block on modeling UI.

The rules include that there should be one and only one Feature element in the model, that the name of Feature, Procedure, Enum is valid, that the container elements has child elements, that the value of properties of commands are valid, and that Procedures and Enums are not be recursively nested. Note that the visual modeling tool/user interface may also enforce some or all of these rules as the user interacts to place blocks.

Step 604 represents constructing the finite state machine. To this end, the compiler computes the finite state machine representation of each element recursively, and then assembles the representations of sibling elements to construct the finite state machine.

Step 606 represents finite state machine normalization. More particularly, the finite state machine constructed at step 604 may need to be normalized to a minimal finite state machine, in order to reduce the number of finite state machine states and simplify the presentation of the finite state machine. This step also enhances the performance of the further processing.

With respect to command sequence data, to use software, a typical user first starts it, performs some operations, and then exits it after the work is done. This process is called a session. As described above, SQM records the commands used in this process, whereby a session typically corresponds to a sequence of commands. Also, the user ID is recorded with a session. To get the usage of a feature, the feature within the command sequence data needs to be recognized.

However, when real world users use a feature of a software product, they often use redundant commands that are irrelevant to the feature itself, such as menu clicks and Undo/Redo. As used herein, such redundant command clicks are referred to as noise or noises. Therefore, the finite state machine is not directly run on the features over the command sequence data. Instead, a noise model is built to handle noise. Various types of noise models may be used; three such noise models relative to Microsoft® Office applications are described herein, however it is readily understood that more noise models may be built for other applications.

One noise model is a menu model, in which for many features, menu clicks can be considered as noises because they do not have a direct impact to the usage of the feature. For example, an inexperienced user may browse and switch between menus or toolbar button dropdowns to find a command; others may use four commands of "Edit menu->Copy->Edit menu->Paste", which is equivalent to "Copy->Paste". The menu model handles such the menu clicks, in part by labeling the menu commands in Microsoft® Office products.

Another noise model is an Undo/Redo model, which handles user errors made during feature usage. Because a user can undo and redo commands, the Undo and Redo commands, as well as the commands being undone and redone may be noise commands. To define this model, all such undoable commands are labeled.

Another noise model is referred to as a User-defined noise model. When users define a feature, they may want to ignore some specific commands for this feature. For example, a user may want to ignore PageDown/PageUp commands during the copy-paste process. One approach provides a mechanism to enable users define a set of commands that can be ignored for one feature.

Figure 7:
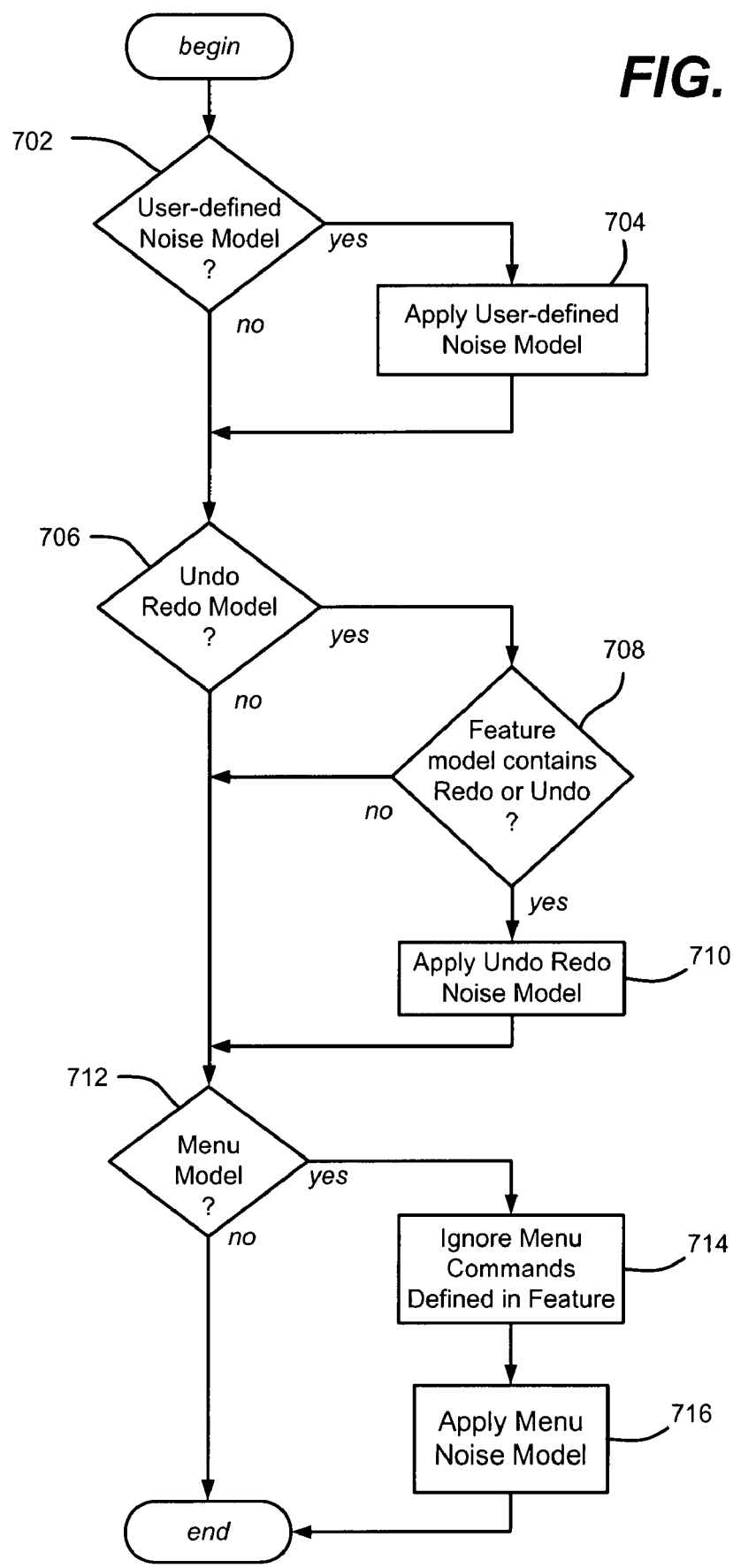
FIG. 7 is a flow diagram representing various example steps taken to handle unnecessary commands and the like (noise) with respect to recorded commands during feature usage.

FIG. 7 describes example steps of applying the three example noise models. By default the noise models are applied to the recognition process to get accurate recognition results. However, users can explicitly prohibit selected noise models, such as evaluated at steps 702, 706 and 714. For example, step 704 applies the user-defined noise model if via step 702 one is available and not prohibited. Also, step 708 checks whether the feature model contains redo or undo, and if not, bypasses the undo noise model at step 710. To apply undo/redo and user-defined noise models, the command sequence data is preprocessed to remove the noise command before feeding them into the finite state machine.

To apply the menu model, the finite state machine is modified by adding transitions for each state. As represented in step 714, when the finite state machine reads a menu command, it does nothing and jumps back to the current state.

Figure 8:
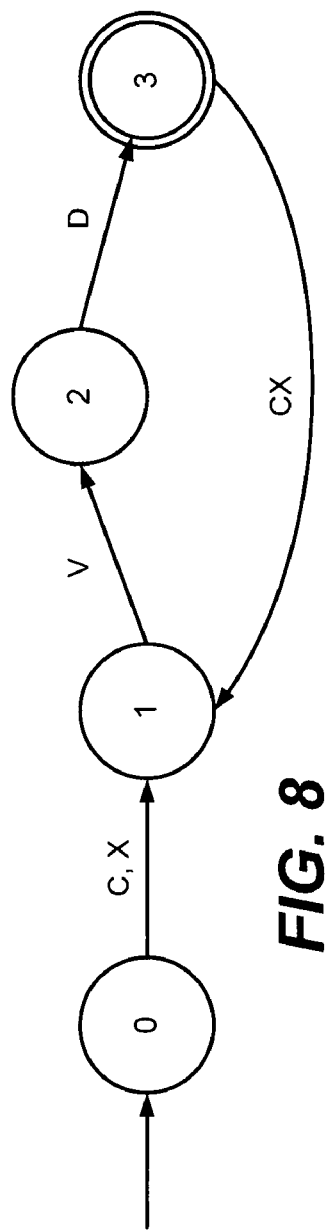
FIG. 8 is an example representation of a state machine for a copy and paste feature usage including a delete command option.

After processing noise, feature recognition can be performed by running the finite state machine over the command sequences. FIG. 8 represents an example of the feature recognition process, where C denotes Copy, X denotes Cut, V denotes Paste and D denotes Delete. In general, a user will copy or cut something, then paste it, and finally delete it. The process may be run repeatedly. FIG. 8 shows that during the recognition, each command in the sequence data is matched with a finite state machine state.

Thus, the finite state machine is initialized at a start state, and after each command the state in finite state machine is changed to an appropriate state. When the finite state machine changes to terminal state, a set of one or more candidate match results is recorded. However, the finite state machine does not end immediately, but continues to scan following commands to find the longest match. After a match, the finite state machine is initialized again for the next matching. The command sequences of two matches are not overlapped.

Figure 9:
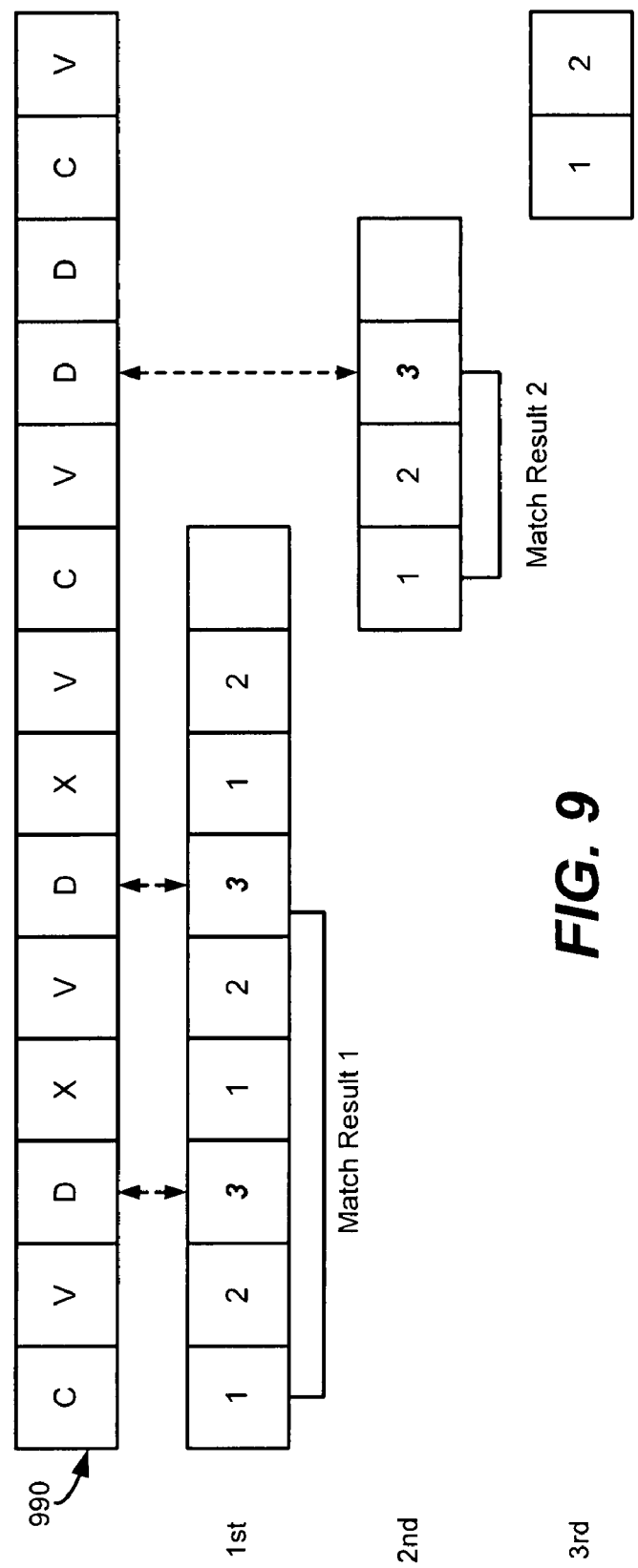
FIG. 9 is an example representation of finding matching commands in a sequence of user commands for use in feature usage analysis.

For example, as represented in FIG. 9, two matches are found in a sequence of commands 990. Applying the state machine of FIG. 8, it is seen that reaching the "delete" or "D" is the terminal state. In a first match, two candidates are found and the longest one is kept as the match result. In a second match, one candidate is found as the match result.

If the match is not successful, the finite state machine rolls back the command sequence to start new matching. The rollback position is determined by various rules. For example, if no candidate match is recorded by last matching, the command next to the last start position is used. Also, if some candidate match is recorded, the command next to the end command of the longest match is used.

In one approach, an optimizing method may be used to perform fast recognition. For example, the finite state machine may be optimized to be a minimized and deterministic one, with the identifiers of states and commands normalized, and lookup tables built for transitions. This enables each transit operation to correspond to a single table look-up instruction in memory.

A command index also may be built for the finite state machine. For each command in command sequence data, an inverted index is built to record the sessions containing the command. When processing recognition of a finite state machine, commands that may occur in the result sequences based on the finite state machine are calculated. Then the index entries of these commands are merged to get sessions containing any of these commands. Finally, the finite state machine is run only on those sessions. Inverted indexes and filtering/merging sessions are further described in the aforementioned U.S. patent applications entitled "Multidimensional Analysis Tool for High Dimensional Data" and "Efficient Data Infrastructure for High Dimensional Data Analysis."

Usage of the command index can greatly reduce the number of sessions look for and enhance the recognition performance. For example, if the command count is n and average sequence length is l, the best case time complexity is $O(n)$ and the worst case is $O(nl)$.

For command sequence data of many applications, a single command has multiple properties, such as the command name or ID, a location where the command is triggered, the state of the software when the command is triggered, and so forth. In one approach, an open architecture is provided to support an arbitrary number of properties of the sequence data. Firstly, the command sequence data is preprocessed to map the combination of multiple property values of a command into a single value. The single value is used as normalized ID of the command. Second, each finite state machine state is expanded to a set of normalized IDs according to the mapping. Then, the matching is processed using normalized IDs. When retrieving results, the normalized IDs are mapped back to the multiple properties.

After recognition, it is not sufficient to analyze only the number of occurrences of a feature. Instead, by analyzing the usage pattern, rich statistical information on how the feature is being used is provided. Examples of such information include:

| | |
|---|---|
| Feature Occurrences | The total number of times the feature occurred in the sequence data. Feature occurrences include exact matches and matches with noise. |
| Feature Command Count | The total number of necessary commands in all occurrences of the feature. |
| Noise Command Count | The total number of unnecessary commands in all occurrences of the feature. |
| Average Feature Length | The average number of feature commands and noise commands per feature occurrence. |
| Session Count | Total number of sessions in which the feature occurred. |
| User Count | The total number of users who used the feature. |
| Feature Details | The command count of each element of the feature. |
| Command Details | The command count of each command with |

| | |
|---|---|
| | each property. |
| Noise Model Details | The exact match occurrence and what counts as noise. |
| Top Feature Command Paths | Top n (e.g., 10) paths of feature. Each path is a way the feature is executed. |
| Feature Length Distribution | Distribution of feature length. |

During the process of feature recognition, the state in finite state machine changes frequently. With a state change, the finite state machine triggers corresponding events such as "read a command", "enter terminal state", and so forth. When an event is triggered, the values of statistical information related with the event are updated. After processing the sequence data, the information is aggregated to produce a feature usage report. This process is extensible to collect more usage information in the future.

Exemplary Operating Environment

Figure 10:
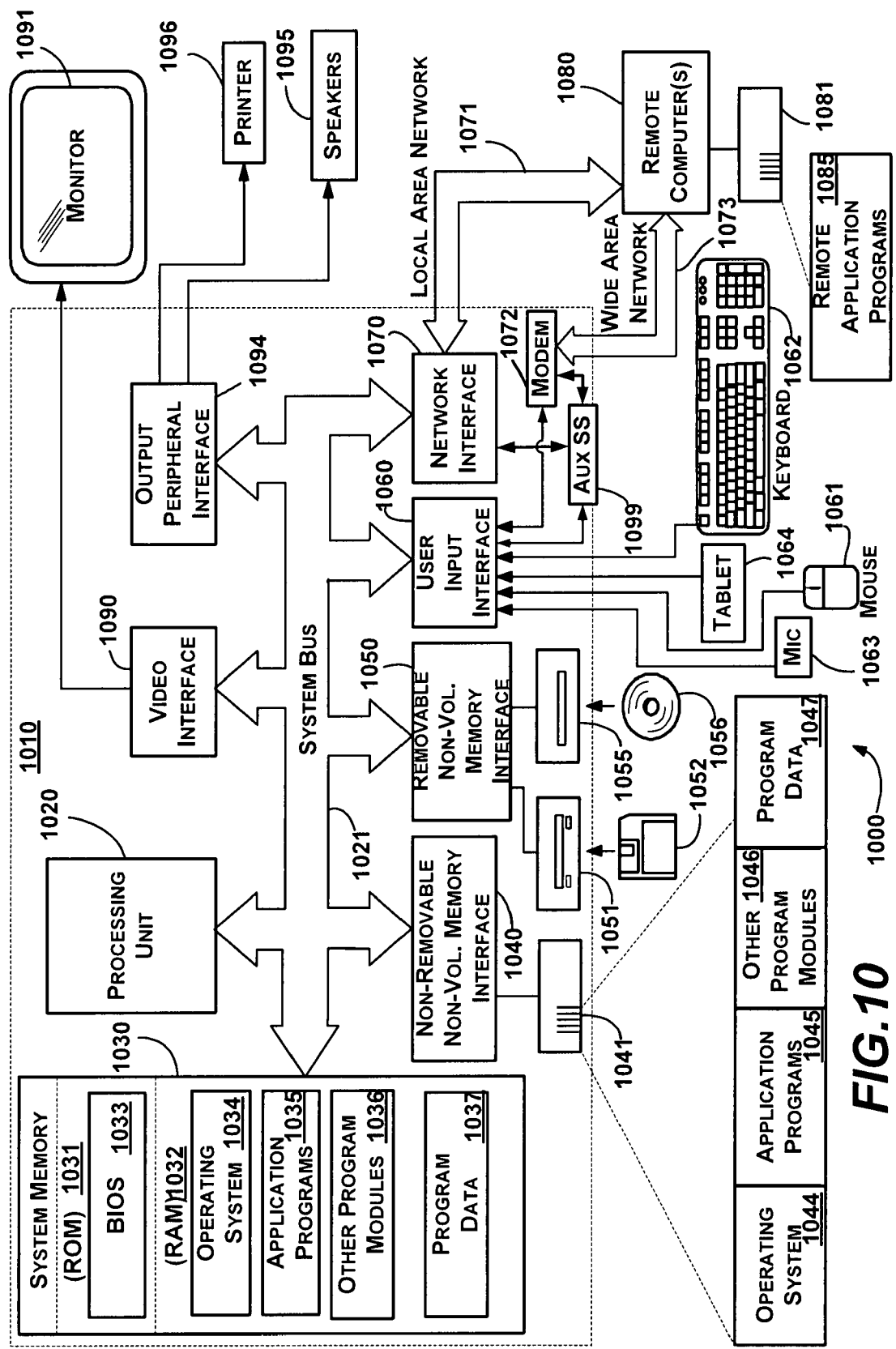
FIG. 10 is an illustrative example of a general-purpose computing environment into which various aspects of the present invention may be incorporated.

FIG. 10 illustrates an example of a suitable computing system environment 1000 in which various example components (e.g., of FIG. 2) may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 10, an exemplary system for implementing various aspects of the invention may include a general purpose computing device in the form of a computer 1010. Components of the computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer-readable media. Computer-readable media can be any available media that can be accessed by the computer 1010 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1010. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036 and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media, described above and illustrated in FIG. 10, provide storage of computer-readable instructions, data structures, program modules and other data for the computer 1010. In FIG. 10, for example, hard disk drive 1041 is illustrated as storing operating system 1044, application programs 1045, other program modules 1046 and program data 1047. Note that these components can either be the same as or different from operating system 1034, application programs 1035, other program modules 1036, and program data 1037. Operating system 1044, application programs 1045, other program modules 1046, and program data 1047 are given different numbers herein to illustrate that, at a minimum, they are different copies. A user may enter commands and information into the computer 1010 through input devices such as a tablet, or electronic digitizer, 1064, a microphone 1063, a keyboard 1062 and pointing device 1061, commonly referred to as mouse, trackball or touch pad. Other input devices not shown in FIG. 10 may include a joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. The monitor 1091 may also be integrated with a touch-screen panel or the like. Note that the monitor and/or touch screen panel can be physically coupled to a housing in which the computing device 1010 is incorporated, such as in a tablet-type personal computer. In addition, computers such as the computing device 1010 may also include other peripheral output devices such as speakers 1095 and printer 1096, which may be connected through an output peripheral interface 1094 or the like.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include one or more local area networks (LAN) 1071 and one or more wide area networks (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060 or other appropriate mechanism. A wireless networking component 1074 such as comprising an interface and antenna may be coupled through a suitable device such as an access point or peer computer to a WAN or LAN. In a networked environment, program modules depicted relative to the computer 1010, or portions thereof, may be stored in the remote memory storage device. By way of example, and not limitation, FIG. 10 illustrates remote application programs 1085 as residing on memory device 1081. It may be appreciated that the network connections shown are exemplary and other means of establishing a communications link between the computers may be used.

An auxiliary subsystem 1099 (e.g., for auxiliary display of content) may be connected via the user interface 1060 to allow data such as program content, system status and event notifications to be provided to the user, even if the main portions of the computer system are in a low power state. The auxiliary subsystem 1099 may be connected to the modem 1072 and/or network interface 1070 to allow communication between these systems while the main processing unit 1020 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system comprising:
   a compiler receiving a feature model outputted by a modeling component, the feature model having been generated by user interactions with the modeling component to define the feature model, the feature model modeling user-invocable commands of an application program that execute a feature of the application program, the compiler compiling the feature model into a finite state machine;
   a set of data collected during a session of use of the application program by a user, the set of data comprising information identifying commands of the application program interactively invoked by the user, the commands including commands that correspond to the feature, the information also indicating the order in which the commands were invoked by the user during the session; and
   a recognition process that, after completion of the session, uses the finite state machine to recognize sequences of user invocations of commands in the set of data that correspond to usages of the feature of the application program.

2. The system of claim 1 wherein the modeling component comprises a user interface by which the feature model is built from feature elements via drag-and-drop operations dragging the feature elements onto a graphical representation of the feature model, the feature elements corresponding to the user-invocable commands that execute the feature.

3. The system of claim 2 wherein the feature model is structured such that each feature element is related to at least one other feature element in accordance with their arrangement in the graphical representation.

4. The system of claim 1 wherein the feature model includes a plurality of elements representing the user-invocable commands, the feature model comprising at least a feature element and child elements comprising one or more of a command element, a select element, a repeat element, an enum element or a procedure element.

5. The system of claim 1 further comprising component that prevents processing by the recognition process of indicia of user-invocable commands in the data set determined to be noise according to a noise model used by the component.

6. The system of claim 1 wherein the noise model includes either a user-defined noise model or an undo noise model, or a menu noise model, or any combination of a user-defined noise model, an undo noise model and/or a menu noise model.

7. The system of claim 1 wherein the set of data comprises software quality metrics data.

8. The system of claim 1, wherein finite state machine comprises a start state and an end state and command states, each command state representing a different of the user invocable commands of the feature, a transition representing invocation of a first user invocable command followed by invocation of a second user-invocable command, wherein different paths from the start state to the end state correspond to different sequences of invocation of the user-invocable commands that execute the feature.

9. The system of claim 1 wherein the recognition process locates usages of the feature by determining if sequences of the commands in the dataset match the state machine.

10. The system of claim 9 wherein the recognition process selects, among overlapping sequences of commands in the data set, a longest sequence that matches the finite state machine.

11. The system of claim 1 further comprising an analyzer, wherein the feature usages are analyzed to output statistical information on how the feature is being used, including information comprising either: feature occurrence information corresponding to a number of times the feature occurred in the set of data, feature command count information corresponding to a number of commands in occurrences of the feature, noise command count information corresponding to commands in the located sequences feature that were not necessary to execute the feature, feature length information corresponding to a number of feature commands and noise commands per feature occurrence, session count information corresponding to a number of sessions in which the feature occurred, user count information corresponding to a number of users who used the feature, feature details information corresponding to a command count of each element of the feature, command details information corresponding to a command count of each command with each property, noise model details information corresponding to an exact match occurrence and what counts as noise, feature command paths information corresponding to a number of paths of feature, or feature length distribution information, or any combination of feature occurrence information, feature command count information, noise command count information, feature length information, session count information, user count information, feature details information, command details information, noise model details information, feature command paths information, or feature length distribution information.

12. At least one computer-readable storage medium having computer executable instructions, which when executed by a computing device perform steps comprising:
processing a sequence of command invocation records recorded in previously captured sessions of use of a program to recognize a specified feature usage in the sequence, each command invocation record representing and having been generated in response to a user invoking any of a plurality of user commands of the program,
the processing including changing states of a finite state machine in accordance with corresponding sequential occurrences of command invocation records, where states of the finite state machine represent respective user commands of the program including at least some of the commands represented by the command invocation records, and using the finite state machine to determine when a command invocation record in the sequence changes the state machine to a terminal state, and storing an indication that the state machine changed to the terminal state 13. The computer-readable storage medium of claim 12 the steps further comprising, continuing processing command invocation records after the state machine changes to the terminal state to attempt to find a longer match of command invocation records.

14. The computer-readable storage medium of claim 12 having further computer-executable instructions comprising, processing subsequent command invocation records in the sequence following the finding of a match.

15. The computer-readable storage medium of claim 12 having further computer-executable instructions comprising, applying at least one noise model to eliminate or skip over at least one command invocation record.

16. The computer-readable storage medium of claim 12 having further computer-executable instructions comprising, based on the finite state machine reaching the terminal state, determining that a feature of the program was executed by a user of the program.

17. A method implemented by a computing device, the method comprising:
displaying a graphical user interface by which a feature of a program is described via user interaction with the graphical user interface, and outputting a feature model comprising a model of different combinations of user commands of the program that can be invoked to execute the feature of the program;
using the feature model to generate a finite state machine comprised of states re resenting the user commands of the model and comprising transitions between the states according to the model;
using the finite state machine to locate usage of the feature within a sequence of command records previously collected during program usage sessions; and
applying a noise model to the command records previously collected during program usage to prevent processing of command records by the state machine that have been identified as noise by the noise model.

18. The method of claim 17 wherein the using the finite state machine comprises determining when a command record changes the state machine to a terminal state of the state machine.

19. The method of claim 17 wherein the feature model includes a plurality of elements, comprising at least a feature element and of either a command element, a select element, a repeat element, an enum element, and/or a procedure element.

20. The method of claim 19 wherein the feature model is structured such that each feature element is related to at least one other feature element by their relative positions, wherein the noise model includes at least one of a user-defined noise model, an undo noise model or a menu noise model, or any combination of a user-defined noise model, an undo noise model or a menu noise model, and wherein the compiler further checks for validity of the feature model, or normalizes the finite state machine, or both checks for validity of the feature model and normalizes the finite state machine.

21. One or more computer-readable storage storing information to configure a computer to perform a process, the process comprising:
receiving a log of a completed session of user interactions with an application program having been comprised of features and associated interactive user interface elements each individually activatable by a user, the log comprising entries each sequentially indicating which of the user interface elements were activated by the user via a user interaction with the application program, each entry having been generated in response to user interaction with the user interface element identified thereby; processing the log of the completed session with an analysis program that parses the entries of the log and identifies which of the features occur in the log by identifying sequences of entries that the analysis program correlates to respective features thereby identifying same; and storing indicia of the identified features.

* * * * *

UNITED STATES PATENT AND TRADEMARK OFFICE
CERTIFICATE OF CORRECTION

| | | |
|---|---|---|
| PATENT NO. | : 7,680,645 B2 | Page 1 of 1 |
| APPLICATION NO. | : 11/818596 | |
| DATED | : March 16, 2010 | |
| INVENTOR(S) | : Yantao Li et al. | |

It is certified that error appears in the above-identified patent and that said Letters Patent is hereby corrected as shown below:

In column 1, line 6, below "APPLICATIONS" insert -- The present application is related to the following copending U.S. patent applications, assigned to the assignee of the present application, filed concurrently and hereby incorporated by reference: --.

In column 12, line 65, in Claim 6, delete "model or an" and insert -- model, or an --, therefor.

In column 13, line 5-6, in Claim 8, delete "user invocable" and insert -- user-invocable --, therefor.

In column 13, line 7, in Claim 8, delete "user invocable" and insert -- user-invocable --, therefor.

In column 14, line 3, in Claim 12, after "state" insert -- . --.

In column 14, line 31, in Claim 17, delete "re resenting" and insert -- representing --, therefor.

In column 14, line 47, in Claim 19, after "element and" delete "of".

Signed and Sealed this

Eighteenth Day of January, 2011

David J. Kappos
*Director of the United States Patent and Trademark Office*